US007693722B2

(12) United States Patent
Kakuno et al.

(10) Patent No.: US 7,693,722 B2
(45) Date of Patent: Apr. 6, 2010

(54) SIMULTANEOUS AUDIO DECODING APPARATUS FOR PLURAL COMPRESSED AUDIO STREAMS

(75) Inventors: Hideyuki Kakuno, Osaka (JP); Masahiro Sueyoshi, Hirakata (JP); Kosuke Nishio, Kadoma (JP)

(73) Assignee: Panasonic Corporation, Osaka (JP)

( * ) Notice: Subject to any disclaimer, the term of this patent is extended or adjusted under 35 U.S.C. 154(b) by 1300 days.

(21) Appl. No.: 11/168,464

(22) Filed: Jun. 29, 2005

(65) Prior Publication Data

US 2006/0080109 A1 Apr. 13, 2006

(30) Foreign Application Priority Data

Sep. 30, 2004 (JP) ............................ 2004-288642

(51) Int. Cl.
*G10L 21/04* (2006.01)
*H04N 7/12* (2006.01)
*H04L 27/00* (2006.01)
*H04M 1/00* (2006.01)

(52) U.S. Cl. ............ 704/503; 375/240.11; 375/240.25; 375/259; 455/550.1

(58) Field of Classification Search ................. 704/503
See application file for complete search history.

(56) References Cited

U.S. PATENT DOCUMENTS 5,937,138 A * 8/1999 Fukuda et al. .............. 386/112
2001/0031007 A1* 10/2001 Fujita et al. ............ 375/240.25
2002/0151324 A1* 10/2002 Tatsumi ...................... 455/550
2003/0053548 A1* 3/2003 Lee et al. .................... 375/259
2003/0142746 A1* 7/2003 Tanaka et al. .......... 375/240.11
2004/0186709 A1 9/2004 Chi

FOREIGN PATENT DOCUMENTS

EP 0952691 10/1999
JP 2001-324998 11/2001

OTHER PUBLICATIONS

English Language Abstract of JP 2001-324998.
NEC Electronics, "System LSI μPD61160 for Digital Hi-Vision Television," which was downloaded from the internet at www.necel.com/digital_av/japanese/mpegdec/d61160.html on Jun. 17, 2005.
NEC Electronics, "System LSI μPD61160 for Digital Hi-Vision Television," which was downloaded from the internet at www.necel.com/digital_av/english/mpegdec/d61160.html on Jun. 17, 2005.

* cited by examiner

*Primary Examiner*—David R Hudspeth
*Assistant Examiner*—Justin W Rider
(74) *Attorney, Agent, or Firm*—Greenblum & Bernstein, P.L.C.

(57) ABSTRACT

An audio decoding apparatus for decoding and reproducing a plurality of compressed audio streams simultaneously without sound interruption, even when the number of samples per frame is different. The audio decoding apparatus includes: a first and second audio decoder which decode two inputted compressed audio streams, and output audio data; a first and second intermediate buffer which temporarily hold the outputted audio data; a first and second audio output unit which convert the audio data into audio signals and output such audio signals; an output control unit which reads the audio data from the first and second intermediate buffer, and transmits the audio data to the first and second audio output unit. The output control unit repeats the reading and transmission of either the same number of samples of audio data or the number of samples of audio data for the same amount of transmission time.

7 Claims, 5 Drawing Sheets

SIMULTANEOUS AUDIO DECODING APPARATUS FOR PLURAL COMPRESSED AUDIO STREAMS

BACKGROUND OF THE INVENTION (1) Field of the Invention

The present invention relates to an audio decoding apparatus which decodes a compressed audio stream, and particularly to an audio decoding apparatus which simultaneously decodes a plurality of audio streams and outputs the decoded audio streams as audio signals.

(2) Description of the Related Art

With the advancement of communication technology and the diversification of audio/video devices in recent years, various types of decoder LSI which decode compressed video and audio signals are being provided.

For example, a high-performance LSI which simultaneously decodes the high-vision video signals for two channels is provided (see non-patent document 1: NEC Electronics, “System LSI μPD61160 for Digital Hi-Vision Television”, Internet <URL:http:// www.necel.com/digital_av/japanese/mpegdec/d61160.html>, Aug. 30, 2004 search). With this LSI, it is possible to view the video of one television program and simultaneously record the video of another television program.

However, although the aforementioned conventional LSI includes two video decoders, with respect to audio decoders, only one is included. As such, with regard to video, streams for two channels can be decoded simultaneously. However, with respect to audio, there is no guarantee that streams for two channels can be decoded simultaneously at all times. In other words, depending on the content and timing of audio streams received, situations arise in which simultaneous decoding is not possible, and as such, problems such as sound interruption and noise, for example, can occur.

Here, it is possible to presume that problems such as sound interruption, and the like, can easily be avoided by adopting a structure in which two audio decoders are included in one LSI. However, in performing a transmission control in which two output processing units are simply made to output Pulse Code Modulation (PCM) data from two decoders on a per frame basis to implement the simultaneous decoding of audio streams of two completely independent channels, sound interruption, and the like, may still occur as there are cases where the number of samples per frame are different for the two audio streams.

FIG. 1 is a timing chart explaining the mechanism for the occurrence of sound interruption that may arise in the case where two audio streams having a different number of samples per frame, are decoded using two audio decoders. ADEC1 and ADEC2 are first and second audio decoders, respectively, which decode separate compressed audio streams and output PCM data. AOUT1 and AOUT2 are first and second output processing units, respectively, which perform digital/analog (D/A) conversion, and so on, on the PCM data and output the result as audio signals. APCM is an output control unit which transmits, on a per frame basis, the respective PCM data outputted from ADEC1 and ADEC2, to AOUT1 and AOUT2, respectively. In the diagram, the vertical axes indicate the processing time and processing order of the frame-units of data, with the passage of time shown moving in the downward direction. Rectangular blocks 1*a* to 1*f*, and 2*a* to 2*f*, in the temporal axis direction, respectively correspond to one frame of data (the same marking being given to the same frame).

As shown in FIG. 1, sound interruption occurs between the outputting of audio for frame 2*c* and 2*d* by AOUT2. This is because, although under normal circumstances, the APCM should receive frame 2*d* outputted by ADEC2 and transmit this to AOUT2 (output request 2 should be given) immediately upon receiving an output completion notification 2 from AOUT2 which has finished the audio output of frame 2*b*, frame 2*d* could not be transmitted to AOUT2 as the decoding by ADEC2 is not yet completed (frame 2*d* still being decoded). Moreover, the reason why the APCM is unable to standby for the completion of the decoding of frame 2*d* by ADEC2 is because PCM data for MIX sound, such as earthquake warnings and the sound effects emitted during remote control operation, which require real-time performance, need to be outputted to AOUT2, together with the audio frame, in a regular cycle.

The reason why the APCM is unable to output the frame 2*d* to AOUT2 in the usual (normal) timing can be traced back to the late timing at which the APCM issues a decoding request (DEC request 2) to ADEC2, and further traced back to the excessively long time spent by the APCM in the transmission of frame 1*c* from ADEC1 to AOUT1. This is because, as the number of samples per frame of the audio stream inputted to ADEC1 is greater than that of the audio stream inputted to ADEC2, the transmission from ADEC1 of frame data having the greater number of samples, requires a longer time, and the processing with respect to ADEC2 (decoding request, and so on) is delayed.

SUMMARY OF THE INVENTION

The present invention is conceived in view of such problems, having as an objective to provide an audio decoding apparatus which can simultaneously decode a plurality of compressed audio streams and reproduce the decoded results without sound interruption.

In order to achieve the aforementioned objective, the audio decoding apparatus in the present invention is an audio decoding apparatus which decodes compressed audio streams and outputs audio signals, said audio decoding apparatus including n audio decoders each operable to decode one of inputted n compressed audio streams and to output audio data, n being not less than two, n buffer memories each operable to temporarily hold the audio data outputted from one of said audio decoders, n audio output units each operable to convert one of the audio data into an audio signal and to output the audio signal, and an output control unit operable to read the audio data from said buffer memories and to transmit the audio data to corresponding audio output units, wherein the output control unit is operable to repeat the reading of the audio data from the n buffer memories and the transmission of the audio data to said corresponding audio output units in the same number of samples or in the number of samples for the same amount of transmission time. Accordingly, as the same number of samples of audio data or audio data for the same amount of transmission time are transmitted from the audio decoders to the audio output units, with respect to the inputted plurality of compressed audio streams, biases in the transmission times of the output control unit are eliminated, the same amount of audio data are supplied to each audio output unit without interruption, and the occurrence of problems such as sound interruption are avoided.

Moreover, in the case where a plurality of compressed audio streams having a different number of samples per frame are inputted, frames having a large number of samples can be transmitted by dividing one frame of audio data into several transmissions. Alternatively, audio data for a plurality of frames can be transmitted collectively in one transmission, for frames having a small number of samples. Accordingly, the transmission of (i) the same number of samples of audio data or (ii) audio data for the same amount of transmission time, for a single transmission is maintained with respect to each compressed audio stream. Moreover, "a single transmission" refers to the transmission with respect to one buffer memory, when the output control unit sequentially repeats the reading of audio data from a buffer memory and the transmission of the read audio data to an audio output unit for the n buffer memories. Furthermore, "one frame" in this specification refers to a gathering of groups of data, and includes, not only the physical frames making up an audio stream, but also one block which is a smaller unit of data making up one physical frame. For example, the unit of decoding is not always limited to a physical frame basis, and there are also cases where it is a unit of data that is smaller than one frame (per block basis). The "one frame" referred to in the present invention, also includes such one block in its meaning.

Furthermore, a number of samples equivalent to (i) a greatest common divisor of the number of samples in one frame for each of the audio data outputted from said audio decoders, or (ii) a greatest common divisor of transmission times required in transmitting one frame for each of the audio data outputted from said audio decoders, can be used as a specific method for determining the number of samples or transmission time for one transmission in the case where a plurality of compressed audio streams having a different number of samples per frame are inputted. Likewise, the least common multiple can be used in place of the greatest common divisor. Although preferability for the use of the greatest common divisor or least common multiple depends on the number of samples in each of the frames, the processing capacity of the output control unit, and so on, in most cases, use of the least common multiple, which decreases the per-transmission size, is preferred. This is because, the number of transmissions per unit of time increases, and it is easy to maintain transmission of a fixed amount of audio data within a fixed time.

Furthermore, it is possible that part of a processing capacity of said output control unit is used to perform the transmission. This is due to the need to maintain the non-occurrence of sound interruption, and the like, even when other processes such as processing for MIX PCM data are added.

Moreover, the present invention can be realized not only as an audio decoding apparatus, but also as an audio decoding method, and a control program that causes a computer to execute the control steps of the output control unit included in the audio decoding apparatus. In addition, it goes without saying that the audio decoding apparatus can be realized as a one LSI.

According to the audio decoding apparatus in the present invention, even in the case where a plurality of compressed audio streams having a different number of samples per frame are inputted, the number of samples of audio data supplied from each of the audio decoders to each of the audio output units is equalized, and the occurrence of problems such as sound interruption and noise, brought about by insufficient supply of audio data to the audio output units is avoided. Accordingly, simultaneous audio reproduction for multiple-streams is realized.

Further Information about Technical Background to this Application

The disclosure of Japanese Patent Application No. 2004-288642 filed on Sep. 30, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, the embodiment of the present invention shall be explained in detail with reference to the diagrams.

Figure 2:
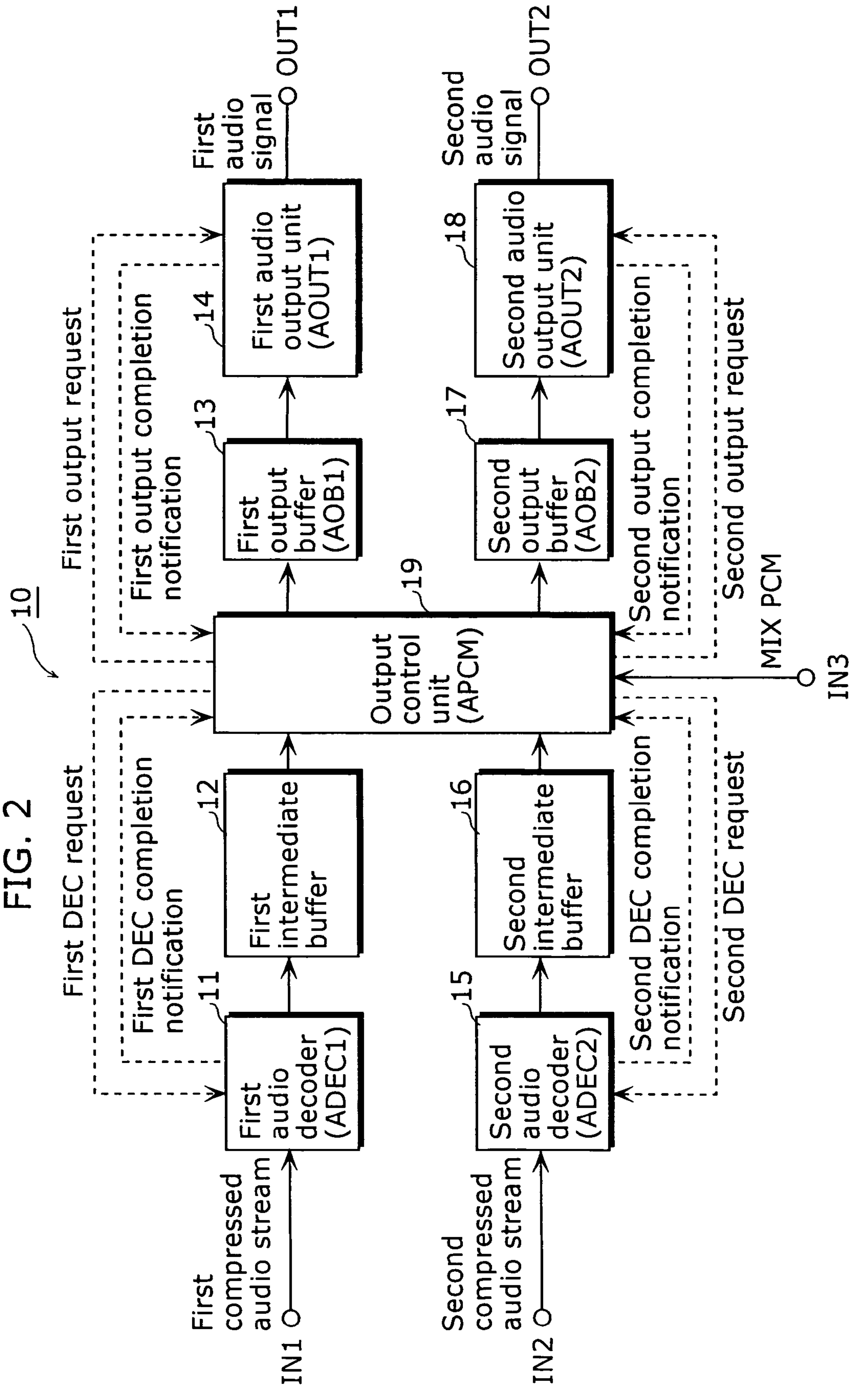
FIG. 2 is a function block diagram showing the structure of the audio decoding apparatus in the embodiment of the present invention.

FIG. 2 is a function block diagram showing the structure of an audio decoding apparatus 10 in the present embodiment. The audio decoding apparatus 10 is an apparatus which decodes two compressed audio streams and reproduces the decoded result. The audio decoding apparatus 10 is structured by (i) the following components for processing a first audio stream: a first audio decoder (ADEC1) 11; a first intermediate buffer 12; a first output buffer (AOB1) 13; and a first audio output unit (AOUT1) 14, and (ii) the following components for processing a second audio stream: a second audio decoder (ADEC2) 2; a second intermediate buffer 16; a second output buffer (AOB2) 17; and a second audio output unit (AOUT2) 18, and (iii) an output control unit 19 which controls the entirety.

The first audio decoder 11 is a decoder which decodes the first audio signal by one frame upon receiving a first DEC (decode) request from the output control unit 19, and outputs the obtained PCM data to the first intermediate buffer 12. When finished decoding, the first audio decoder 11 outputs a first DEC (decode) completion notification to that effect, to the output control unit 19.

The first intermediate buffer 12 is a memory, and the like, which temporarily stores the PCM data outputted from the first audio decoder 11.

The first output buffer 13 is a memory, and the like, which temporarily stores the PCM data to be stored into the first audio output unit 14.

The first audio output unit 14 is a D/A converter, and the like, which outputs a first audio signal by performing D/A conversion on the PCM data stored in the first output buffer 13 upon receiving a first output request from the output control unit 19. When finished outputting, the first audio output unit 14 outputs a first DEC (decode) completion notification to that effect, to the output control unit 19.

In the same manner, the second audio decoder 15 is a decoder which decodes the second audio signal by one frame upon receiving a second DEC (decode) request from the output control unit 19, and outputs the obtained PCM data to the second intermediate buffer 16. When finished decoding, the second audio decoder 15 outputs a second DEC (decode) completion notification to that effect, to the output control unit 19.

The second intermediate buffer 16 is a memory, and the like, which temporarily stores the PCM data outputted from the second audio decoder 15.

The second output buffer 17 is a memory, and the like, which temporarily stores the PCM data to be stored into the second audio output unit 18.

The second audio output unit 18 is a D/A converter, and the like, which outputs a second audio signal by performing D/A conversion on the PCM data stored in the second output buffer 18 upon receiving a second output request from the output control unit 19. When finished outputting, the second audio output unit 18 outputs a second DEC (decode) completion notification to that effect, to the output control unit 19.

The output control unit 19 is a controller which transmits the PCM data stored in the first intermediate buffer 12 and second intermediate buffer 16 to the first output buffer 13 and the second output buffer 17, respectively, in order to have the corresponding PCM data obtained by the first audio decoder 11 and second audio decoded 15 outputted by the first audio output unit 14 and second audio output unit 18, respectively. Furthermore, the output control unit 19 is provided with an input terminal for the MIX PCM data and also includes a function for mixing the PCM data inputted from this input terminal with the respective PCM data read from the first intermediate buffer 12 and second intermediate buffer 16, and outputting the result to the first output buffer 13 and second output buffer 17.

During the transmission between buffers, the output control unit 19 uses PCM data with the same number of samples as the unit of transmission (for one transmission), and alternately performs the process of (i) reading out PCM data from the first intermediate buffer 12 and transmitting this to the first output buffer 13, and (ii) reading out PCM data from the second intermediate buffer 16 and transmitting this to the second output buffer 17. In other words, the output control unit 19 alternately performs the respective transmission processes on the PCM data outputted from the first audio decoded 11 and the PCM data outputted from the second audio decoded 15, using the same amount of processing time. Moreover, depending on pre-set parameters, the output control unit 19 uses as the unit of transmission, any of (1) a designated fixed number of samples, (2) the greatest common divisor for the number of samples per frame of the first and second compressed audio streams, and (3) the least common multiple for the number of samples per frame of the first and second compressed audio streams.

For example, in the case where the number of samples per frame of the first and second compressed audio streams are 240 and 80, respectively, the output control unit 19 alternately repeats between the transmission from the first intermediate buffer 12 to the first output buffer 13, and the transmission from the second intermediate buffer 16 to the second output buffer 17, using 80 samples which is the greatest common divisor, as the unit of transmission. At this time, the output control unit 19 (i) repeats the transmission to the first audio output unit 14 using 1 frame (80 samples) as the unit of transmission, with respect to the first audio decoded 11, but (ii) repeats the transmission to the second audio output unit 18 using a PCM data group (80 samples) unit which divides 1 frame into 3 parts, with respect to the second audio decoder 15.

Next, the operation of the audio decoding apparatus 10 structured in the aforementioned manner, shall be explained.

Figure 3:
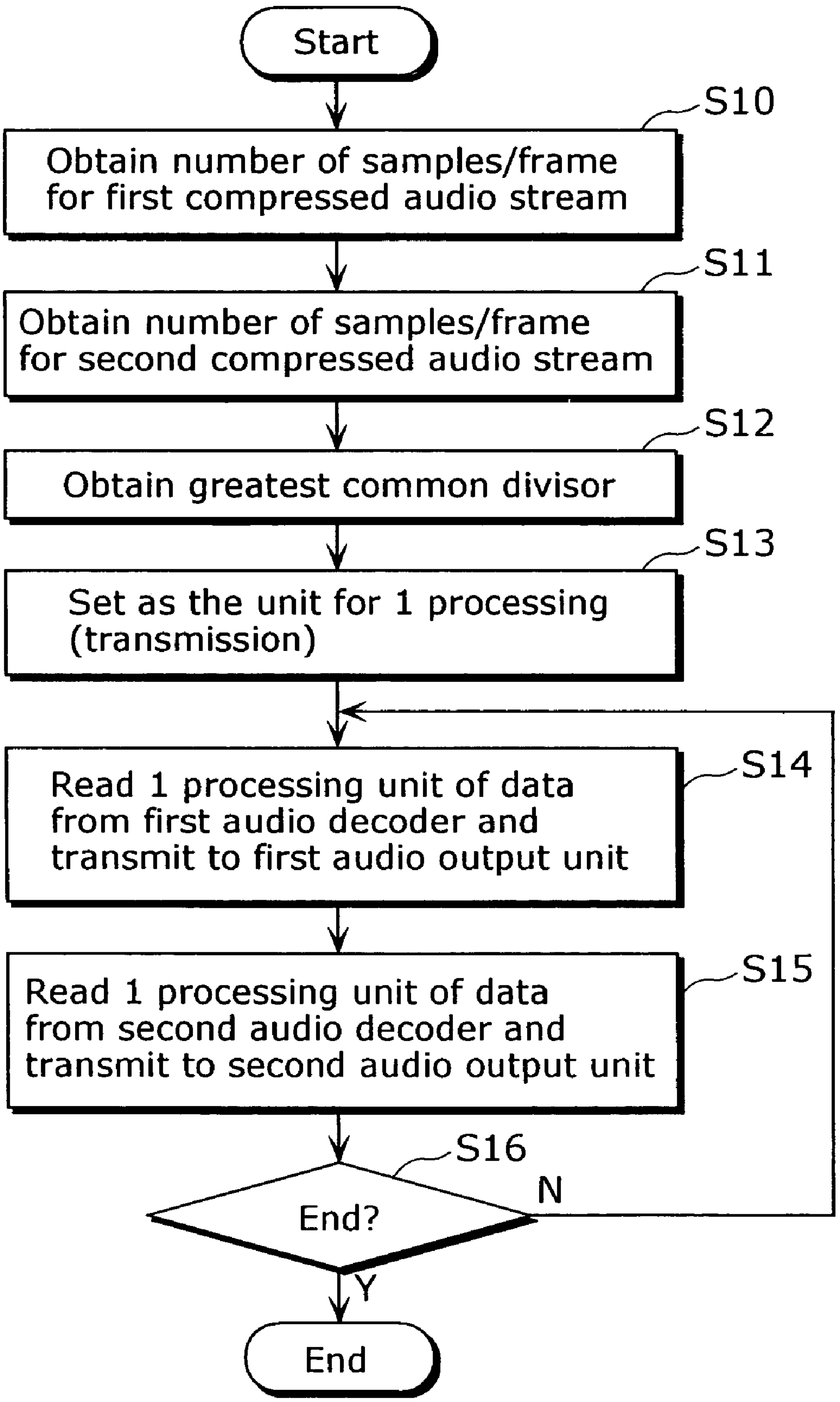
FIG. 3 is a flowchart showing the overall operation of the output control unit of the audio decoding apparatus.

FIG. 3 is a flowchart showing the overall operation of the output control unit 19 of the audio decoding apparatus 10. In the case where the use of the abovementioned (2), in other words, the greatest common divisor for the number of samples per frame of the first and second compressed audio streams is set, the output control unit 19 obtains the number of samples per frame "S1" for the first compressed audio stream to be inputted to the first audio decoder 11 (S10) and obtains the number of samples per frame "S2" for the second compressed audio stream to be inputted to the second audio decoder 15 (S11).

Subsequently, the greatest common divisor for the two sample numbers S1 and S2 is calculated (S12), and set (stored internally) as the (transmission) unit used in one processing (S13).

Next, when the first and second compressed audio streams are inputted, the output control unit 19 (i) repeatedly outputs, in frame units, first and second DEC requests to the first audio decoder 11 and second audio decoder 15, and (ii) using such currently set unit of processing, alternately repeats the transmission of PCM data from the first intermediate buffer 12 to the first output buffer 13 (S14), and the transmission of PCM data from the second intermediate buffer 16 to the second output buffer 17 (S15), until an instruction to end is given (S16).

As the output control unit 19 alternately repeats the transmission of the same number of samples of PCM data to the first audio decoder 11 and the second audio decoder 15 in the aforementioned manner, the output processing time for each decoder becomes equal, PCM data for the same amounts of time are alternately outputted to the first audio output unit 14 and second audio output unit 18, and problems such as sound interruption do not occur.

Figure 4:
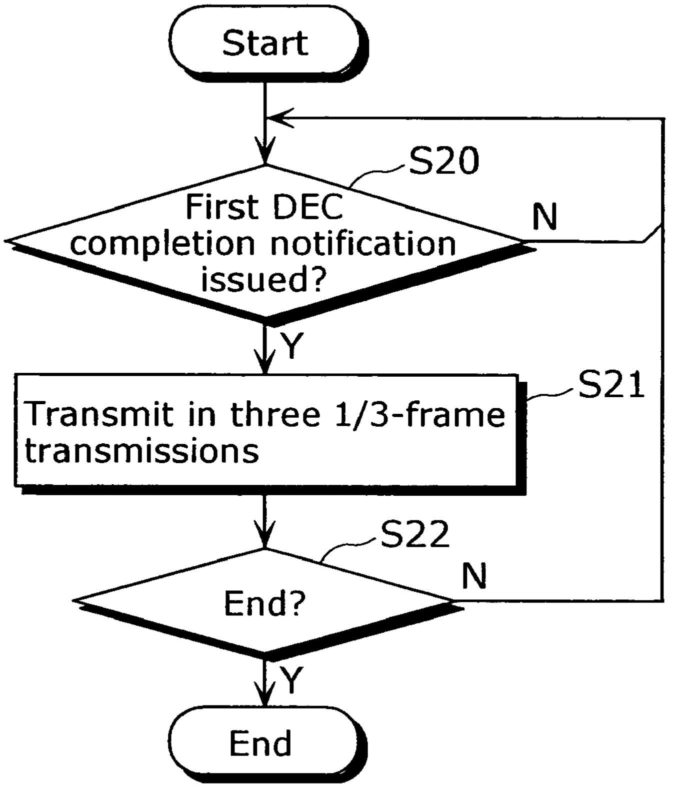
FIG. 4 is a flowchart showing the control performed by the output control unit on the first audio decoder of the audio decoding apparatus.

FIG. 4 is a flowchart showing the control performed by the output control unit 19 on the first audio decoder 11 of the audio decoding apparatus 10. Here, the flowchart indicates the control procedure in the case where the output control unit 19 transmits PCM data outputted from the first audio decoder 11 to the first audio output unit 14, in units of PCM data groups dividing 1 frame into 3 parts.

Upon receiving a first DEC completion notification from the first audio decoder 11 (S20), the output control unit 19 (i) reads out PCM data from the first intermediate buffer 12, in units of PCM data groups dividing 1 frame into 3 parts, and stores these into the first output buffer 13, and (ii) repeats the output of a first output request to the first audio output unit 14, three times (S21). Subsequently, the same procedures (S20~S21) are repeated for the transmission of subsequent frames, until an instruction to end is given (S22). In this manner, with respect to an audio stream with a large number of samples per frame, the output control unit 19 repeats transmissions in which one frame of PCM data is transmitted through several partial transmissions, from the first intermediate buffer 12 to the first output buffer 13.

Figure 5:
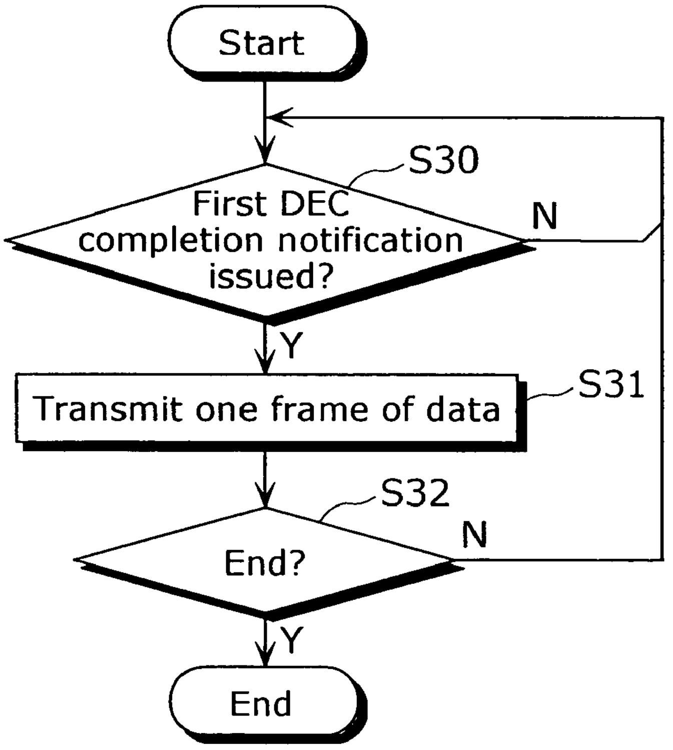
FIG. 5 is a flowchart showing the control performed by the output control unit on the second audio decoder of the audio decoding apparatus.

FIG. 5 is a flowchart showing the control performed by the output control unit 19 on the second audio decoder 15 of the audio decoding apparatus 10. Here, the flowchart indicates the control procedure in the case where the output control unit 19 transmits PCM data outputted from the second audio decoder 15 to the second audio output unit 18 on a per frame basis.

Upon receiving a second DEC completion notification from the second audio decoder 15 (S30), the output control unit 19 (i) reads out one frame of PCM data from the second intermediate buffer 16 and stores this into the second output buffer 17, and (ii) outputs a second output request to the second audio output unit 18 (S31). Subsequently, the same procedures (S30~S31) are repeated for the transmission of subsequent frames, until an instruction to end is given (S32). In this manner, with respect to an audio stream with a small number of samples per frame, the output control unit 19 repeats the per-frame-basis transmission of PCM data from the second intermediate buffer 16 to the second output buffer 17.

Figure 1:
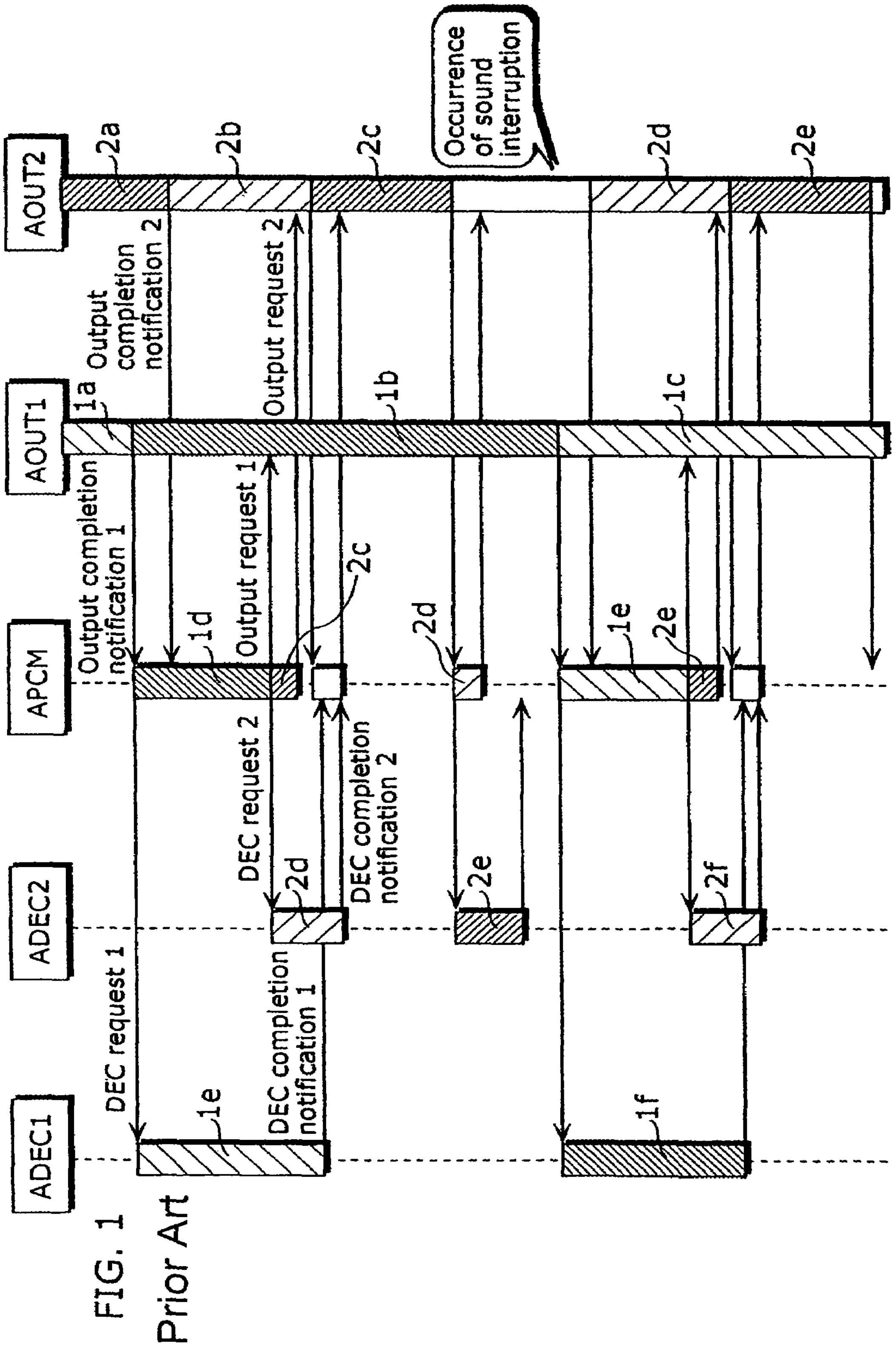
FIG. 1 Prior Art
FIG. 1 is a timing chart explaining the mechanism behind the occurrence of sound interruption in the conventional technology.
Figure 6:
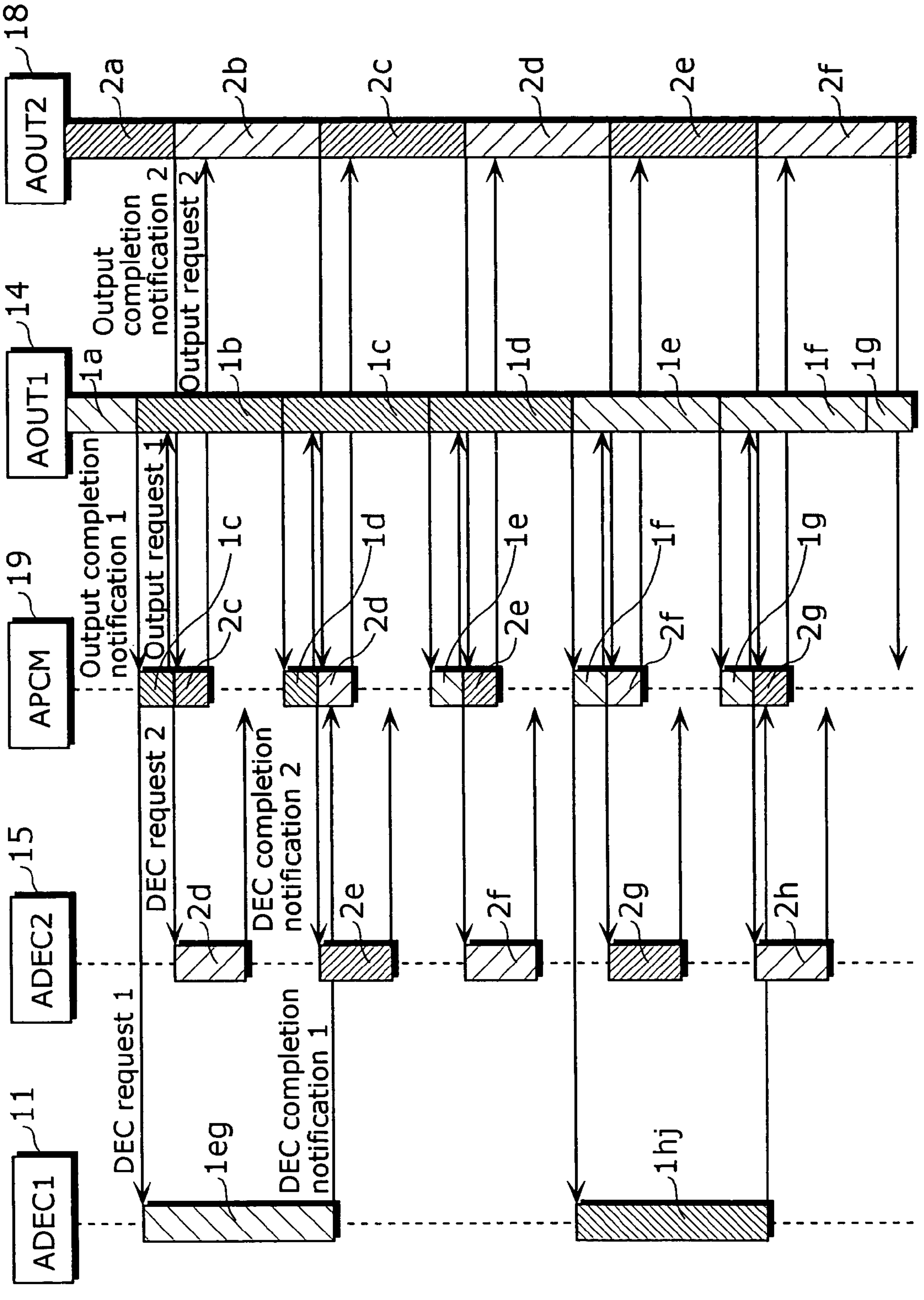
FIG. 6 is a diagram showing the timing of processes performed by each component of the audio decoding apparatus.

FIG. 6 is a diagram showing the timing of processes performed by each component of the audio decoding apparatus 10, and corresponds to FIG. 1 which is used to describe the conventional technology. Here, the case is shown where the number of samples per frame S1 for the first compressed audio stream and the number of samples per frame S2 for the second compressed audio stream are on a 3:1 ratio, and the sample-number S2 is adopted as the unit of transmission.

The output control unit 19 transmits the PCM data outputted from the first audio decoder 11 and the PCM data outputted from the second audio decoder 11 alternately (frame 1*c*, 2*c*, 1*d*, 2*d*, and so on) and only in the same number of samples each (same processing times), to the first audio output unit 14 and second audio output unit 18, respectively.

Furthermore, the output control unit 19 transmits one frame of PCM data decoded by the first audio decoder 11 (for example, frame leg) in three partial transmissions (for example, frame 1*e*, 1*f*, 1*g*). On the other hand, the output control unit 19 transmits one frame of PCM data decoded by the second audio decoder 15 in one transmission.

As a result of controlling transmission in the aforementioned manner, the respective audio signals are reproduced and outputted, sequentially without the occurrence of sound interruption, as can be seen in the output processing for the first audio output unit 14 and the second audio output unit 18 shown in the diagram. This is because, with respect to the respective PCM data outputted from the first audio decoder 11 and second audio decoder 15, the number of samples per unit time of transmission (time spent in transmitting) to the first audio output unit 14 and the second output unit 18 are the same, with frames having a large number of samples being transmitted in parts by the output control unit 19.

Moreover, as shown in the diagram, the output control unit 19 performs the transmission of PCM data within the range of part of its processing capacity. In other words, the output control unit 19 transmits PCM data with a certain margin in its processing capacity (processing time). As such, even in the case where irregular processing such as processing for MIX PCM data arises, the occurrence of sound interruption is prevented, without any disruptions in the supply of PCM data to the first audio output unit 14 and the second audio output unit 18.

As described above, according to the present embodiment, simultaneous audio reproduction for multiple streams is realized in each audio output unit without the occurrence of sound interruption and noise even when the number of samples per frame for a plurality of audio streams inputted is different, as the output control unit transmits a number of samples for an equal amount of time, from each audio decoder to each audio output unit.

Although described, up to this point, based on the embodiment, the audio decoding apparatus in the present invention is not limited to such embodiment. For example, in the present embodiment, transmission in several partial transmissions is performed with respect to frames having a large number of samples per frame. However, it is also possible to have, in contrast, a plurality of frames transmitted all in one transmission, with respect to frames having a small number of samples per frame. The performance of either the transmission of a frame in several transmissions or the transmission of several frames all at once can be determined by taking into account the number of samples, frame rate, processing capacity of the output control unit, and so on, and selecting appropriately.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

As an audio decoding apparatus which simultaneously reproduces the audio of multiple streams, the present invention can be used as an audio decoding LSI, and so on, built into devices such as a DVD player, a DVD recorder, and a tuner for digital broadcasts, for example.

What is claimed is:

1. An audio decoding apparatus which decodes compressed audio streams and outputs audio signals, the audio decoding apparatus comprising:

n audio decoders that each operate to decode one of inputted n compressed audio streams and to output audio data, n being not less than two;

n buffer memories that each operate to temporarily hold the audio data outputted from one of the audio decoders;

n audio outputters that each operate to convert one of the audio data into an audio signal and to output the audio signal;

an output controller which operates to read the audio data from the buffer memories and to transmit the audio data to corresponding audio outputters, wherein the n audio decoders operate to decode the compressed audio streams on a per frame basis, the output controller operates to repeat the transmission of the audio data using, as a number of samples of audio data in one transmission, a number of samples equivalent to (i) a greatest common divisor of a number of samples in one frame for each of the audio data outputted from the audio decoders, or (ii) a greatest common divisor of transmission times required in transmitting one frame for each of the audio data outputted from the audio decoders, and part of a processing capacity of the output controller is used to perform the transmission.

2. The audio decoding apparatus according to claim 1, wherein the output controller operates to transmit, from at least one of the n buffer memories, one frame of the audio data through several partial transmissions.

3. The audio decoding apparatus according to claim 1, wherein the output controller operates to perform transmission, from at least one of the n buffer memories, by transmitting several frames of audio data per transmission.

4. An audio decoding method for use in an audio decoding apparatus which decodes compressed audio streams and outputs audio signals, wherein the audio decoding apparatus includes:

n audio decoders that each operate to decode one of inputted n compressed audio streams and to output audio data, n being not less than two;

n buffer memories that each operate to temporarily hold the audio data outputted from one of the audio decoders;

n audio outputters that each operate to convert one of the audio data into an audio signal and to output the audio signal; and an output controller which operates to read the audio data from the buffer memories and to transmit the audio data to corresponding audio outputters, the audio decoding method comprises:

reading the audio data from the buffer memories and transmitting the audio data to the corresponding audio outputters, wherein the n audio decoders operate to decode the compressed audio streams on a per frame basis, the transmitting of the audio data uses, as a number of samples of audio data in one transmission, a number of samples equivalent to (i) a greatest common divisor of a number of samples in one frame for each of the audio data outputted from the audio decoders, or (ii) a greatest common divisor of transmission times required in transmitting one frame for each of the audio data outputted from the audio decoders, is repeated, and part of a processing capacity of the output controller is used to perform the transmission.

5. A computer readable medium having a program stored therein for an audio decoding apparatus which decodes compressed audio streams and outputs audio signals, wherein the audio decoding apparatus includes:

n audio decoders that each operate to decode one of inputted n compressed audio streams and to output audio data, n being not less than two;

n buffer memories that each operate to temporarily hold the audio data outputted from one of the audio decoders;

n audio outputters that each operate to convert one of the audio data into an audio signal and to output the audio signal; and an output controller which operates to read the audio data from the buffer memories and to transmit the audio data to corresponding audio outputters, the program causing a computer to execute:

reading the audio data from the buffer memories and transmitting the audio data to the corresponding audio outputters, wherein the n audio decoders operate to decode the compressed audio streams on a per frame basis, the transmitting of the audio data uses, as a number of samples of audio data in one transmission, a number of samples equivalent to (i) a greatest common divisor of a number of samples in one frame for each of the audio data outputted from the audio decoders, or (ii) a greatest common divisor of transmission times required in transmitting one frame for each of the audio data outputted from the audio decoders, is repeated, and part of a processing capacity of the output controller is used to perform the transmission.

6. An audio decoding apparatus which decodes compressed audio streams and outputs audio signals, the audio decoding apparatus comprising:

n audio decoders that each operate operates to decode one of inputted n compressed audio streams and to output audio data, n being not less than two;

n buffer memories that each operate to temporarily hold the audio data outputted from one of the audio decoders;

n audio outputters that each operate to convert one of the audio data into an audio signal and to output the audio signal; and an output controller operates to read the audio data from the buffer memories and to transmit the audio data to corresponding audio outputters, wherein, the n audio decoders operate to decode the compressed audio streams on a per frame basis, and the output controller operates to repeat the reading of the audio data from the n buffer memories and the transmission of the audio data to the corresponding audio outputters using, as a number of samples of audio data in one transmission, a number of samples equivalent to (i) a greatest common divisor of a number of samples in one frame for each of the audio data outputted from the audio decoders, or (ii) a greatest common divisor of transmission times required in transmitting one frame for each of the audio data outputted from the audio decoders.

7. An audio decoding apparatus which decodes compressed audio streams and outputs audio signals, the audio decoding apparatus comprising:

n audio decoders that each operate to decode one of inputted n compressed audio streams and to output audio data, n being not less than two;

n buffer memories that each operate to temporarily hold the audio data outputted from one of the audio decoders;

n audio outputters that each operate to convert one of the audio data into an audio signal and to output the audio signal; and an output controller which operates to read the audio data from the buffer memories and to transmit the audio data to corresponding audio outputters, wherein, the n audio decoders operate to decode the compressed audio streams on a per frame basis, and the output controller operates to repeat the reading of the audio data from the n buffer memories and the transmission of the audio data to the corresponding audio outputters using, as a number of samples of audio data in one transmission, a number of samples equivalent to (i) a least common multiple of a number of samples in one frame for each of the audio data outputted from the audio decoders, or (ii) a least common multiple of transmission times required in transmitting one frame for each of the audio data outputted from the audio decoders.

* * * * *